(12) United States Patent
Nakai

(10) Patent No.: US 12,015,181 B2
(45) Date of Patent: Jun. 18, 2024

(54) ELECTROLYTE SHEET FOR SOLID OXIDE FUEL CELL, MANUFACTURING METHOD FOR ELECTROLYTE SHEET FOR SOLID OXIDE FUEL CELL, AND SINGLE CELL FOR SOLID OXIDE FUEL CELL

(71) Applicant: Murata Manufacturing Co., Ltd., Nagaokakyo (JP)

(72) Inventor: Hideaki Nakai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 347 days.

(21) Appl. No.: 17/673,319

(22) Filed: Feb. 16, 2022

(65) Prior Publication Data
US 2022/0173420 A1 Jun. 2, 2022

Related U.S. Application Data
(63) Continuation of application No. PCT/JP2020/031085, filed on Aug. 18, 2020.

(30) Foreign Application Priority Data
Aug. 22, 2019 (JP) ................ 2019-152139

(51) Int. Cl.
  *H01M 8/1016* (2016.01)
(52) U.S. Cl.
  CPC .. *H01M 8/1016* (2013.01); *H01M 2300/0071* (2013.01)

(58) Field of Classification Search
  CPC ............. H01M 8/1016; C04B 35/486
  See application file for complete search history.

(56) References Cited

U.S. PATENT DOCUMENTS

| | | | |
|---|---|---|---|
| 2009/0081512 A1 | 3/2009 | Blanchard et al. | |
| 2018/0339945 A1 | 11/2018 | Baba | |

FOREIGN PATENT DOCUMENTS

| | | | |
|---|---|---|---|
| JP | 2010517208 A | 5/2010 | |
| JP | 2011096645 A | 5/2011 | |

(Continued)

OTHER PUBLICATIONS

Written Opinion of the International Searching Authority issued for PCT/JP2020/031085, date of mailing Nov. 2, 2020.

(Continued)

*Primary Examiner* — Sarah A. Slifka
(74) *Attorney, Agent, or Firm* — ArentFox Schiff LLP

(57) ABSTRACT

An electrolyte sheet for solid oxide fuel cells that includes a ceramic plate body having a warpage height of not more than 300 μm, wherein a maximum value among values of $100 \times Q/L_X$, $100 \times R/L_Y$, and $100 \times S/L_X$ is not greater than 1, where Q is a maximum difference between a second side $D_2$ and a second virtual straight line $V_2$ in an X coordinate, R is a maximum difference between a third side $D_3$ and a third virtual straight line $V_3$ in a Y coordinate, S is a maximum difference between a fourth side $D_4$ and a fourth virtual straight line $V_4$ in the X coordinate, $L_X$ is a length of a virtual rectangle in an X-axis direction, and $L_Y$ is a length of the virtual rectangle in a Y-axis direction.

17 Claims, 6 Drawing Sheets

(56) References Cited

FOREIGN PATENT DOCUMENTS

| | | | |
|---|---|---|---|
| JP | 2014191943 | A | 10/2014 |
| JP | 2018199598 | A | 12/2018 |

OTHER PUBLICATIONS

International Search Report issued for PCT/JP2020/031085, date of mailing Nov. 2, 2020.

ELECTROLYTE SHEET FOR SOLID OXIDE FUEL CELL, MANUFACTURING METHOD FOR ELECTROLYTE SHEET FOR SOLID OXIDE FUEL CELL, AND SINGLE CELL FOR SOLID OXIDE FUEL CELL

CROSS REFERENCE TO RELATED APPLICATIONS

The present application is a continuation of International application No. PCT/JP2020/031085, filed Aug. 18, 2020, which claims priority to Japanese Patent Application No. 2019-152139, filed Aug. 22, 2019, the entire contents of each of which are incorporated herein by reference.

FIELD OF THE INVENTION

The present invention relates to an electrolyte sheet for solid oxide fuel cells, a method of producing an electrolyte sheet for solid oxide fuel cells, and a unit cell for solid oxide fuel cells.

BACKGROUND OF THE INVENTION

A solid oxide fuel cell (SOFC) is a device that produces electric energy through reactions of $H_2+O^{2-}\rightarrow H_2O+2e^-$ at the fuel electrode and $(\frac{1}{2})O_2+2e^-\rightarrow O^{2-}$ at the air electrode. A solid oxide fuel cell is a stack of unit cells each including an electrolyte sheet made of a ceramic plate body and a fuel electrode and an air electrode that are formed on the electrolyte sheet.

Meanwhile, electrolyte sheets are expected to have a reduced thickness for an increase in the power generation efficiency of the solid oxide fuel cells. However, sintering a thin unsintered plate body for a reduction in thickness of an electrolyte sheet tends to cause warpage of the resulting ceramic plate body. Thus, a reduction in thickness of an electrolyte sheet requires prevention or reduction of warpage of the ceramic plate body.

For example, Patent Literature 1 discloses a method of producing a highly smooth ceramic plate body by stacking resin sheets or resin layers on a surface of an unsintered plate body using a resin slurry containing a spherical resin powder and compression-bonding the stack.
Patent Literature 1: JP 2018-199598 A

SUMMARY OF THE INVENTION

However, the resin sheets or resin layers used in the production method disclosed in Patent Literature 1 are not uniform in thickness, which causes warpage in some cases.

When such resin sheets or resin layers are stacked on an unsintered plate body, the unsintered plate body is subjected to variation in load from the resin sheets or resin layers. When the unsintered plate body is fired under such conditions, the resulting ceramic plate body will suffer from severe warpage. In addition, during firing, a high load area of the unsintered plate body is less susceptible to heat shrinkage while a low load area thereof is more susceptible to heat shrinkage, which results in variation of heat shrinkage degree inside the unsintered plate body. Due to variation of heat shrinkage degree inside the unsintered plate body, the resulting ceramic plate body will be severely deformed from the unsintered plate body, failing to achieve the desired shape (size).

When an electrolyte sheet made of such a ceramic plate body deformed from the desired shape is combined with a metal separator having a desired shape to produce a stack for solid oxide fuel cells, at least a portion of the electrolyte sheet sticks out of the metal separator or is dented away from the metal separator. A portion of the electrolyte sheet which sticks out of the metal separator is susceptible to breakage when the portion is bumped against a hot module during assembly of the stack into the hot module. A portion of the electrolyte sheet which is dented away from the metal separator is susceptible to gas leakage due to an insufficient width of a gas seal portion between the electrolyte sheet and the metal separator. Breakage of the electrolyte sheet or gas leakage as described above may degrade the stack or reduce the power generation efficiency of a solid oxide fuel cell with the electrolyte sheet.

The present invention was made to solve the above issues, and aims to provide an electrolyte sheet for solid oxide fuel cells which has less or no deformation and less or no warpage. The present invention also aims to provide a method of producing the electrolyte sheet for solid oxide fuel cells. Furthermore, the present invention aims to provide a unit cell for solid oxide fuel cells which includes the electrolyte sheet.

The electrolyte sheet for solid oxide fuel cells of the present invention includes a ceramic plate body having a warpage height of not more than 300 μm, the ceramic plate body having a shape defined by four sides in clockwise order in a plan view from a thickness direction of the ceramic plate body, the sides including a first side, a second side meeting the first side at a first corner, a third side meeting the second side at a second corner, and a fourth side meeting the third side at a third corner and meeting the first side at a fourth corner. In an XY coordinate system of the ceramic plate body in the plan view from the thickness direction with an X axis being a first virtual straight line approximated with 10 points on the first side, a Y axis being a second virtual straight line perpendicular to the first virtual straight line and passing through a point with an X coordinate representing an average of X coordinates of 10 points on the second side, and a virtual origin being an intersection of the first virtual straight line and the second virtual straight line, a third virtual straight line parallel to the first virtual straight line and passing through a point with a Y coordinate representing an average of Y coordinates of 10 points on the third side and a fourth virtual straight line perpendicular to the first virtual straight line and passing through a point with an X coordinate representing an average of X coordinates of 10 points on the fourth side are defined such that a maximum value among values of $100\times Q/L_X$, $100\times R/L_Y$, and $100\times S/L_X$ is not greater than 1, where Q is a maximum difference between the second side and the second virtual straight line in the X coordinate, R is a maximum difference between the third side and the third virtual straight line in the Y coordinate, S is a maximum difference between the fourth side and the fourth virtual straight line in the X coordinate, $L_X$ is a length of a virtual rectangle in an X-axis direction, and $L_Y$ is a length of the virtual rectangle in a Y-axis direction, the virtual rectangle being defined by the first virtual straight line, the second virtual straight line, the third virtual straight line, and the fourth virtual straight line.

A method of producing an electrolyte sheet for solid oxide fuel cells of the present invention includes: pressing together an unsintered plate body containing a ceramic material powder and a resin layer containing a resin powder by hydrostatic pressure to produce an unsintered body; and firing the unsintered body to burn off the resin layer and sinter the unsintered plate body into a ceramic plate body.

A unit cell for solid oxide fuel cells of the present invention includes: a fuel electrode; an air electrode; and the electrolyte sheet for solid oxide fuel cells of the present invention between the fuel electrode and the air electrode.

The present invention can provide an electrolyte sheet for solid oxide fuel cells which has less or no deformation and less or no warpage. The present invention can also provide a method of producing the electrolyte sheet for solid oxide fuel cells. Furthermore, the present invention can provide a unit cell for solid oxide fuel cells which includes the electrolyte sheet.

DETAILED DESCRIPTION OF THE PREFERRED EMBODIMENTS

The electrolyte sheet for solid oxide fuel cells (hereinafter, also referred to as the electrolyte sheet) of the present invention, the method of producing an electrolyte sheet for solid oxide fuel cells (hereinafter, also referred to as the method of producing an electrolyte sheet) of the present invention, and the unit cell for solid oxide fuel cells (hereinafter, also referred to as the unit cell) of the present invention are described below. The present invention is not limited to the following preferred embodiments, and may be suitably modified without departing from the gist of the present invention. Combinations of two or more preferred features described in the following preferred features are also within the scope of the present invention.

The drawings are schematic drawings, and the dimensions, the aspect ratio, the scale, and other parameters may differ from those of the actual products.

Electrolyte Sheet for Solid Oxide Fuel Cells

Figure 1:
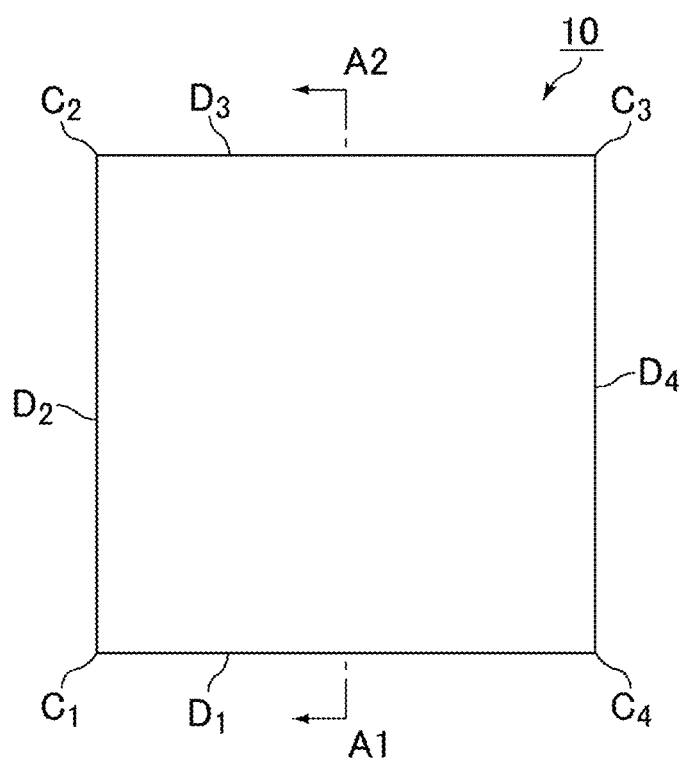
FIG. 1 is a schematic plan view of an example of an electrolyte sheet for solid oxide fuel cells of the present invention.
Figure 2:
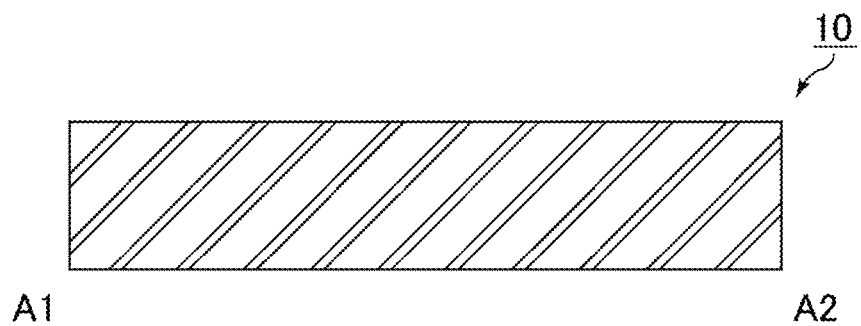
FIG. 2 is a schematic cross-sectional view of a portion taken along line A1-A2 in FIG. 1.

FIG. 1 is a schematic plan view of an example of an electrolyte sheet for solid oxide fuel cells of the present invention. FIG. 2 is a schematic cross-sectional view of a portion taken along line A1-A2 in FIG. 1.

An electrolyte sheet 10 for solid oxide fuel cells shown in FIG. 1 and FIG. 2 is made of a ceramic plate body.

The ceramic plate body contains a sintered body of a solid electrolyte such as scandia-stabilized zirconia or yttria-stabilized zirconia. In particular, the electrolyte sheet 10 is preferably made of a ceramic plate body containing sintered scandia-stabilized zirconia. The electrolyte sheet 10, which is made of a ceramic plate body containing sintered scandia-stabilized zirconia, has a higher conductivity. Thus, a solid oxide fuel cell with the electrolyte sheet 10 has a higher power generation efficiency.

As shown in FIG. 1, the electrolyte sheet 10 has a shape defined by four sides in clockwise order in a plan view from a thickness direction of the sheet (vertical direction in FIG. 2), the sides including a first side $D_1$, a second side $D_2$, a third side $D_3$, and a fourth side $D_4$. The second side $D_2$ meets the first side $D_1$ at a first corner $C_1$. The third side $D_3$ meets the second side $D_2$ at a second corner $C_2$. The fourth side $D_4$ meets the third side $D_3$ at a third corner $C_3$ and meets the first side $D_1$ at a fourth corner $C_4$.

Although not shown, preferably, the first corner $C_1$, the second corner $C_2$, the third corner $C_3$, and the fourth corner $C_4$ of the electrolyte sheet 10 are rounded in a plan view from the thickness direction thereof. In the electrolyte sheet 10, all the first corner $C_1$, the second corner $C_2$, the third corner $C_3$, and the fourth corner $C_4$ may be rounded, or some of these corners may be rounded.

Preferably, the electrolyte sheet 10 is provided with a through hole penetrating the electrolyte sheet 10 in the thickness direction, although not shown. Such a through hole functions as a gas flow path in a solid oxide fuel cell. One through hole or two or more through holes may be provided.

In a plan view from the thickness direction, a through hole may have a circular shape or any other shape.

Such a through hole may be provided at any position.

The plan view size of the electrolyte sheet 10 is 109 mm×109 mm, for example.

The electrolyte sheet 10 has a thickness of preferably not more than 200 μm, more preferably of not more than 130 μm. Also, the electrolyte sheet 10 has a thickness of preferably not less than 30 μm, more preferably not less than 50 μm.

The thickness of the electrolyte sheet 10 is determined as follows. First, the thickness is measured at randomly selected nine sites within a region excluding the portions 5 mm inside the peripheral edges of the sheet with a U-shape Frame Sheet Metal Micrometer (available from Mitutoyo Corporation, PMU-MX). The average of the thicknesses measured at the nine sites is calculated. The average is taken as the thickness of the electrolyte sheet 10.

Preferably, recesses are scattered on a first main surface and a second main surface of the electrolyte sheet 10, although not shown. With the recesses scattered on the first main surface and the second main surface of the electrolyte sheet 10, the area of contact between the electrodes and gas is large in a solid oxide fuel cell with the electrolyte sheet 10. This ultimately increases the power generation efficiency of the solid oxide fuel cell. The recesses may be scattered only on one of the first main surface and the second main surface of the electrolyte sheet 10.

In the electrolyte sheet 10, the warpage height is not more than 300 μm. With the warpage height of the electrolyte sheet 10 being not more than 300 μm, it is possible to provide the electrolyte sheet 10 with less or no warpage. Thus, a solid oxide fuel cell with the electrolyte sheet 10 has a higher power generation efficiency. Preferably, the warpage height of the electrolyte sheet 10 is not more than 200 μm.

The warpage height of the electrolyte sheet 10 is defined as follows. First, the height of the electrolyte sheet 10 is measured at 16 points to create a virtual plane using, for example, a video measuring system (available from Nikon Corporation, NEXIV VMZ-R6555). Then, the height of the outer edge of the electrolyte sheet 10 from the virtual plane is calculated as the warpage height.

In the electrolyte sheet 10, in an XY coordinate system of the ceramic plate body in a plan view from the thickness direction with an X axis being a first virtual straight line approximated with 10 points on the first side $D_1$, a Y axis being a second virtual straight line perpendicular to the first virtual straight line and passing through a point with an X coordinate representing an average of X coordinates of 10 points on the second side $D_2$, and a virtual origin being an intersection of the first virtual straight line and the second virtual straight line, a third virtual straight line parallel to the first virtual straight line and passing through a point with a Y coordinate representing an average of Y coordinates of 10 points on the third side $D_3$ and a fourth virtual straight line perpendicular to the first virtual straight line and passing through a point with an X coordinate representing an average of X coordinates of 10 points on the fourth side $D_4$ are defined such that a maximum value among values of $100 \times Q/L_X$, $100 \times R/L_Y$, and $100 \times S/L_X$ is not greater than 1, where Q is a maximum difference between the second side $D_2$ and the second virtual straight line in the X coordinate, R is a maximum difference between the third side $D_3$ and the third virtual straight line in the Y coordinate, S is a maximum difference between the fourth side $D_4$ and the fourth virtual straight line in the X coordinate, $L_X$ is a length of a virtual rectangle in an X-axis direction, and $L_Y$ is a length of the virtual rectangle in a Y-axis direction, the virtual rectangle being defined by the first virtual straight line, the second virtual straight line, the third virtual straight line, and the fourth virtual straight line. In other words, the electrolyte sheet 10 satisfies the followings: $100 \times Q/L_X \leq 1$, $100 \times R/L_Y \leq 1$, and $100 \times S/L_X \leq 1$.

These formulas "$100 \times Q/L_X$", "$100 \times R/L_Y$", and "$100 \times X/L_X$" each represent the deformation degree (shear rate) of the electrolyte sheet 10 relative to the virtual rectangle resembling the desired shape. With the maximum deformation degree being not greater than 1%, it is possible to provide the electrolyte sheet 10 with less or no deformation from the desired shape, i.e., the electrolyte sheet 10 in which the straightness of each of the first side $D_1$, the second side $D_2$, the third side $D_3$, and the fourth side $D_4$ is high and the perpendicularity of each pair of adjacent sides of these four sides is high. When the electrolyte sheet 10 as described above is combined with a metal separator having a desired shape to produce a stack for solid oxide fuel cells, the electrolyte sheet 10 will not stick out of the metal separator or will not be dented away from the metal separator. This prevents, for example, degradation of the stack for solid oxide fuel cells and a reduction in power generation efficiency of a solid oxide fuel cell with the electrolyte sheet 10, which are attributable to breakage of the electrolyte sheet 10, gas leakage, or the like. In the electrolyte sheet 10, preferably, a maximum value among values of $100 \times Q/L_X$, $100 \times R/L_Y$, and $100 \times S/L_X$ is not greater than 0.5.

Figure 3:
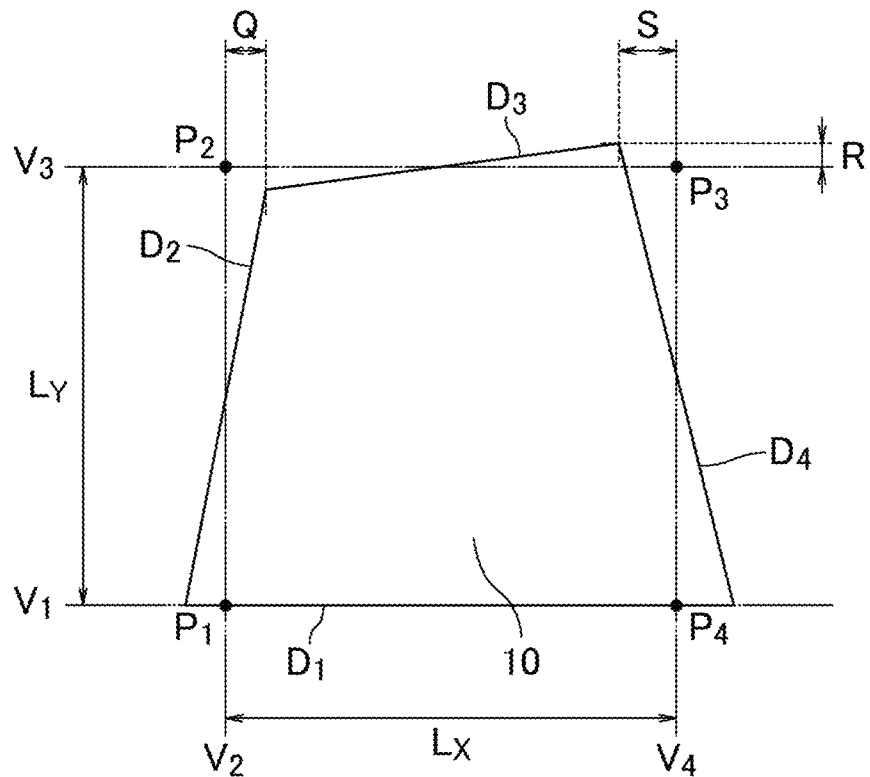
FIG. 3 is a schematic plan view for describing a method of evaluating the deformation degree of an electrolyte sheet.

FIG. 3 is a schematic plan view for describing a method of evaluating the deformation degree of an electrolyte sheet. Each of the following coordinates is measured using, for example, a video measuring system "NEXIV VMZ-R6555" available from Nikon Corporation.

As shown in FIG. 3, first, a first virtual straight line $V_1$ approximated with 10 points on the first side $D_1$ is defined. Here, to define the first virtual straight line $V_1$ may be defined by measuring XY coordinates of 10 points on the first side $D_1$ relative to an X axis and a Y axis, and approximating these XY coordinates of the 10 points by a method such as least squares.

Then, using the first virtual straight line $V_1$ as the X axis, a second virtual straight line $V_2$ is defined which is perpendicular to the first virtual straight line $V_1$ and passing through a point with an X coordinate representing an average of X coordinates of 10 points on the second side $D_2$. Here, 10 points on the second side $D_2$ may be measured using a straight line perpendicular to the first virtual straight line $V_1$ as a Y axis to define the second virtual straight line $V_2$ perpendicular to the first virtual straight line $V_1$ and passing through a point with an X coordinate representing an average of the X coordinates of the 10 points on the second side $D_2$.

Then, an XY coordinate system is defined in which the first virtual straight line $V_1$ is the X axis, the second virtual straight line $V_2$ is the Y axis, and an intersection $P_1$ of the first virtual straight line $V_1$ and the second virtual straight line $V_2$ is the virtual origin.

In the XY coordinate system, Y coordinates of 10 points on the third side $D_3$ are measured to define a third virtual straight line $V_3$ parallel to the first virtual straight line $V_1$ and passing through a point with a Y coordinate representing an average of the Y coordinates of the 10 points on the third side $D_3$.

In the same XY coordinate system, X coordinates of 10 points on the fourth side $D_4$ are measured to define a fourth virtual straight line $V_4$ perpendicular to the first virtual straight line $V_1$ and passing through a point with an X coordinate representing an average of the X coordinates of the 10 points on the fourth side $D_4$.

When measuring coordinates of 10 points on each of the first side $D_1$, the second side $D_2$, the third side $D_3$, and the fourth side $D_4$, it is preferred to select 10 points at which the side is divided into equal lengths.

Next, in the XY coordinate system described above, a virtual rectangle $P_1P_2P_3P_4$ is defined which is defined by the first virtual straight line $V_1$, the second virtual straight line $V_2$, the third virtual straight line $V_3$, and the fourth virtual straight line $V_4$. Then, a length $L_X$ of the virtual rectangle $P_1P_2P_3P_4$ in an X-axis direction, i.e., a direction in which the first virtual straight line $V_1$ extends, and a length $L_Y$ of the virtual rectangle $P_1P_2P_3P_4$ in a Y-axis direction, i.e., a direction in which the second virtual straight line $V_2$ extends are determined. The virtual rectangle $P_1P_2P_3P_4$ includes a rectangle in which $L_X \neq L_Y$ and a square in which $L_X = L_Y$. In the same XY coordinate system, a maximum difference Q between the second side $D_2$ and the second virtual straight line $V_2$ in the X coordinate, a maximum difference R between the third side $D_3$ and the third virtual straight line $V_3$ in the Y coordinate, and a maximum difference S between the fourth side $D_4$ and the fourth virtual straight line $V_4$ in the X coordinate are determined.

The values determined above are substituted into "$100 \times Q/L_X$", "$100 \times R/L_Y$", and "$100 \times S/L_X$" for calculation. It suffices if a maximum value among the values of "$100 \times Q/L_X$", "$100 \times R/L_Y$", and "$100 \times S/L_X$" calculated as described above is not greater than 1.

In FIG. 3, the electrolyte sheet 10 has a shape deformed from the virtual rectangle $P_1P_2P_3P_4$ for the sake of description of a method of evaluating the deformation degree of the electrolyte sheet 10. However, the electrolyte sheet 10 actually has the same or similar shape as the virtual rectangle $P_1P_2P_3P_4$ because a maximum value among the values of "$100 \times Q/L_X$", "$100 \times R/L_Y$", and "$100 \times S/L_X$" is not greater than 1.

Method of Producing Electrolyte Sheet for Solid Oxide Fuel Cells

The electrolyte sheet for solid oxide fuel cells of the present invention is produced by the following method, for example.

Producing Ceramic Green Sheets

Figure 4:
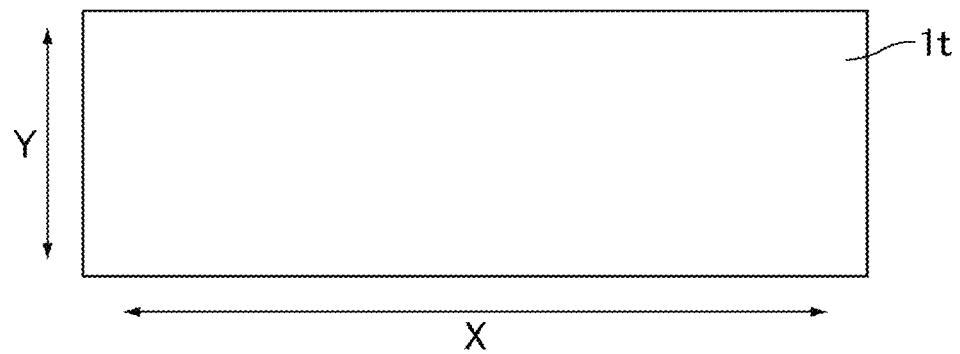
FIG. 4 is a schematic plan view of an example of producing ceramic green sheets.
Figure 5:
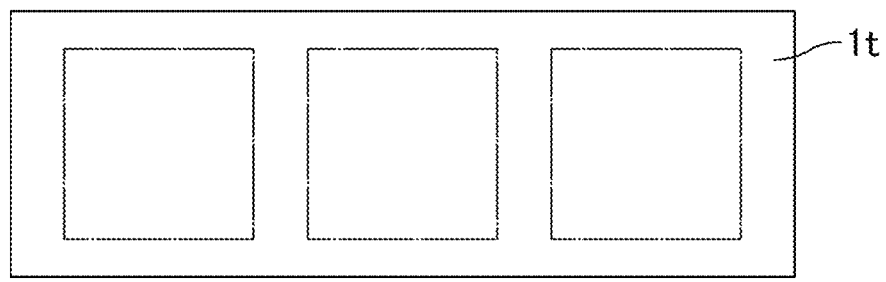
FIG. 5 is another schematic plan view of the example of producing ceramic green sheets.
Figure 6:
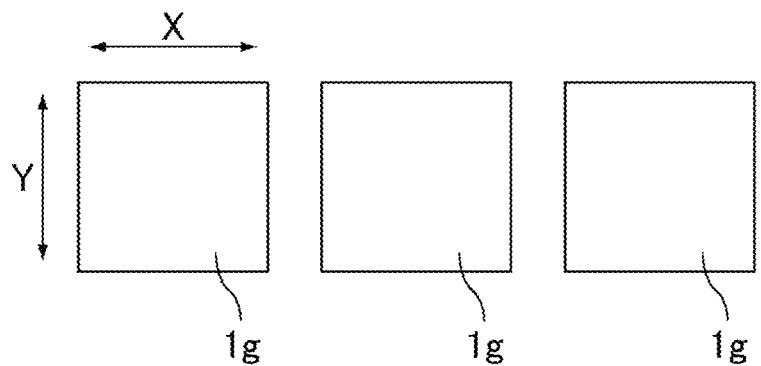
FIG. 6 is yet another schematic plan view of the example of producing ceramic green sheets.

FIG. 4 is a schematic plan view of an example of producing ceramic green sheets. FIG. 5 is another schematic plan view of the example of producing ceramic green sheets. FIG. 6 is yet another schematic plan view of the example of producing ceramic green sheets.

A ceramic material powder, a binder, a dispersant, an organic solvent, and the like are mixed to prepare a ceramic slurry. A first main surface of a carrier film is coated with the obtained ceramic slurry to produce ceramic green tape 1t as shown in FIG. 4.

The ceramic green tape 1t is preferably produced by tape casting, particularly preferably doctor blading or calendaring. In FIG. 4, the casting directions for the tape casting are indicated by X and the directions perpendicular to the casting directions are indicated by Y.

The ceramic material powder may be a solid electrolyte powder such as scandia-stabilized zirconia powder or yttria-stabilized zirconia powder. In particular, the ceramic material powder preferably contains scandia-stabilized zirconia powder.

The resulting ceramic green tape 1t is punched to obtain pieces having a predetermined size by a known technique as shown in FIG. 5, and the carrier film is removed from the pieces. Thus, ceramic green sheets 1g as shown in FIG. 6 are produced. Punching of the ceramic green tape 1t and removal of the carrier film may be performed in any order.

Producing Unsintered Plate Body

Figure 7:
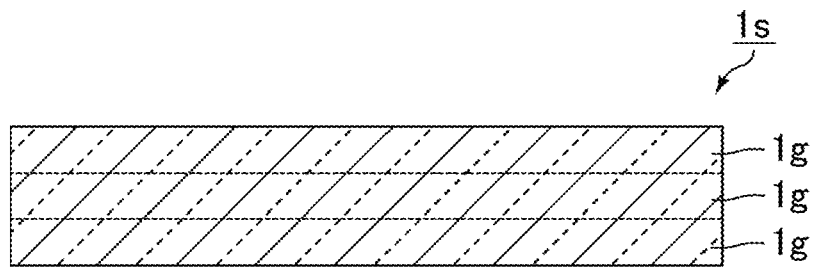
FIG. 7 is a schematic cross-sectional view of an example of producing an unsintered plate body.

FIG. 7 is a schematic cross-sectional view of an example of producing an unsintered plate body.

As shown in FIG. 7, an unsintered plate body 1s is produced by stacking three ceramic green sheets 1g and compression-bonding the stack.

The number of ceramic green sheets 1g used to produce the unsintered plate body 1s may be three as shown in FIG. 7, or two or four or more. The ceramic green sheets 1g may be compression-bonded, or may simply be stacked on one another without being compression-molded. When the unsintered plate body 1s includes a plurality of ceramic green sheets 1g, the thickness of a ceramic plate body to be obtained can be controlled as appropriate in a simple manner.

The unsintered plate body 1s may be producing using one ceramic green sheet 1g. In this case, the step shown in FIG. 7 is omitted.

Producing Resin Layer

Figure 8:
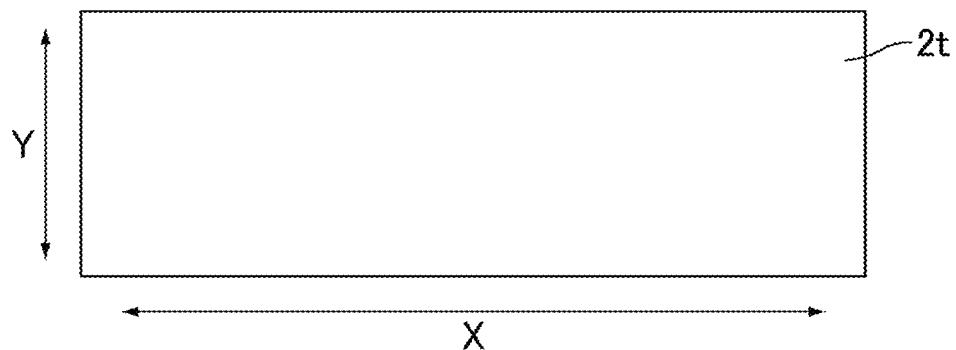
FIG. 8 is a schematic plan view of an example of producing resin layers.
Figure 9:
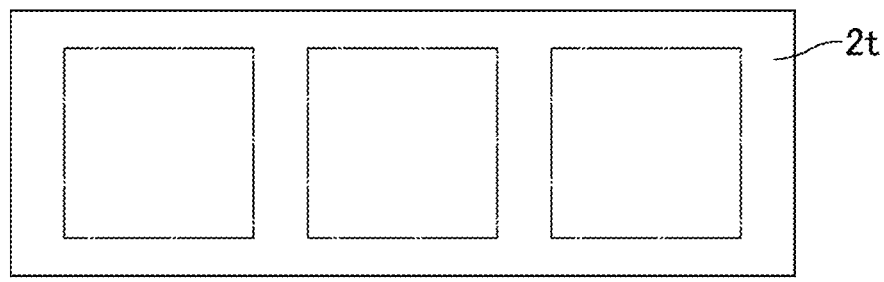
FIG. 9 is another schematic plan view of the example of producing resin layers.
Figure 10:
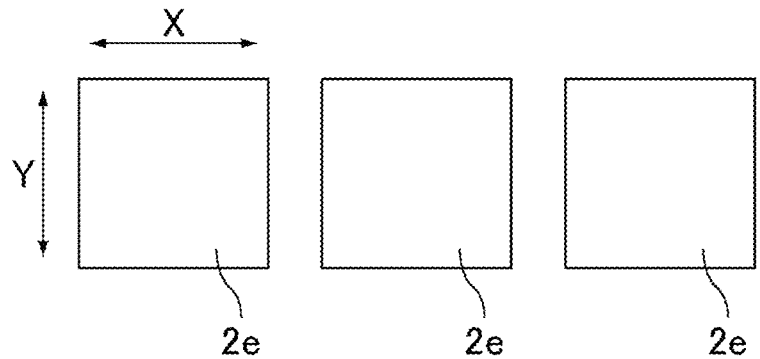
FIG. 10 is yet another schematic plan view of the example of producing resin layers.

FIG. 8 is a schematic plan view of an example of producing resin layers. FIG. 9 is another schematic plan view of the example of producing resin layers. FIG. 10 is yet another schematic plan view of the example of producing resin layers.

First, a resin powder, a binder, a dispersant, an organic solvent, and the like are mixed to prepare a resin slurry. A first main surface of a carrier film is coated with the obtained resin slurry to produce resin tape 2t as shown in FIG. 8.

The resin tape 2t is preferably produced by tape casting, particularly preferably doctor blading or calendaring. In FIG. 8, the casting directions for the tape casting are indicated by X and the directions perpendicular to the casting directions are indicated by Y.

The resin powder is preferably made of a resin material that is poorly soluble in an organic solvent used in production of a resin slurry. The expression "poorly soluble in an organic solvent" herein means that when 0.1 g of a resin powder and 100 g of an organic solvent are mixed at room temperature (25° C.) for 24 hours, there remains a visually observable residue. The organic solvent used to prepare a resin slurry is, for example, at least one solvent (alone or in a mixture) selected from toluene, ethanol, isopropanol, butyl acetate, ethyl acetate, terpineol, and water. In this case, the resin powder is made of a crosslinked acrylic resin, for example.

Preferably, the resin powder has a spherical shape. When the resin powder has a spherical shape, its median size $D_{50}$ is, for example, not less than 0.3 μm and not more than 10 μm.

When the resin powder has a spherical shape, the median size $D_{50}$ of the resin powder is defined as the particle size at 50% in a cumulative particle size distribution curve of the resin powder expressed as cumulative percentage against particle size scale. The particle size distribution of the resin powder is measured with, for example, a laser diffraction particle size distribution measuring device. The median size $D_{50}$ used here is the equivalent spherical diameter because the resin powder may have a shape distorted through the production processes.

When the resin powder has a spherical shape, the resin powder has a smaller surface area per weight, so that the amount of binder required for preparation of a highly fluid resin slurry is reduced. This makes it possible to produce a resin layer having a high resin powder content, so that many recesses can be formed on a first main surface and a second main surface of a ceramic plate body to be obtained.

Next, the resin tape 2t is punched to obtain pieces having a predetermined size by a known technique as shown in FIG. 9, and the carrier film is removed from the pieces. Thus, a resin sheet as a resin layer 2e as shown in FIG. 10 is produced. Punching of the resin tape 2t and removal of the carrier film may be performed in any order.

When producing the resin layer 2e, a resin slurry may be applied to one or both of a first main surface and a second main surface of the unsintered plate body 1s instead of producing a resin sheet.

The resin layer 2e has a thickness after drying of not less than 10 μm and not more than 18 μm, for example.

Producing Unsintered Body

Figure 11:
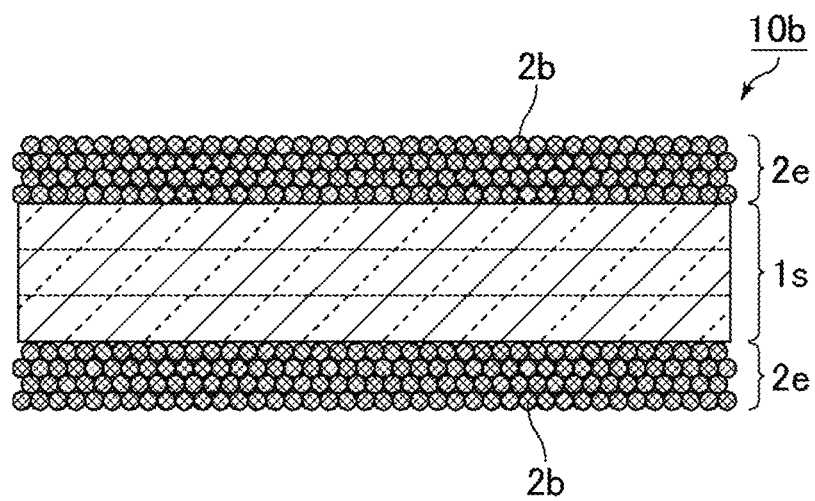
FIG. 11 is a schematic cross-sectional view showing how an unsintered plate body and resin layers are stacked in the example of producing an unsintered body.
Figure 12:
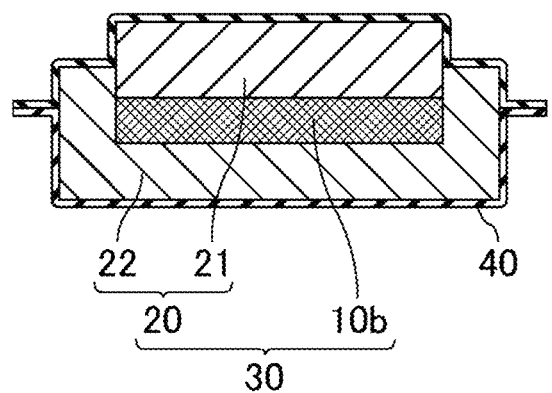
FIG. 12 is a schematic cross-sectional view showing how an assembly of a laminate block in a mold is vacuum sealed for pressing by hydrostatic pressure in the example of producing an unsintered body.
Figure 13:
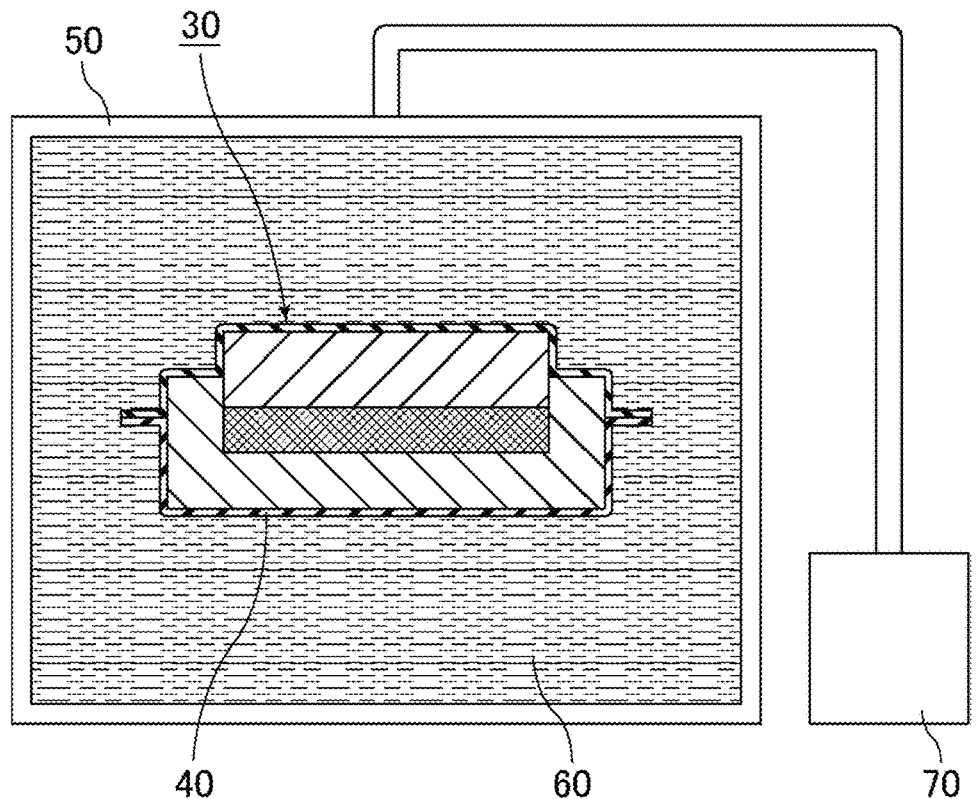
FIG. 13 is a schematic cross-sectional view showing how pressing by hydrostatic pressure is performed in the example of producing an unsintered body.
Figure 14:
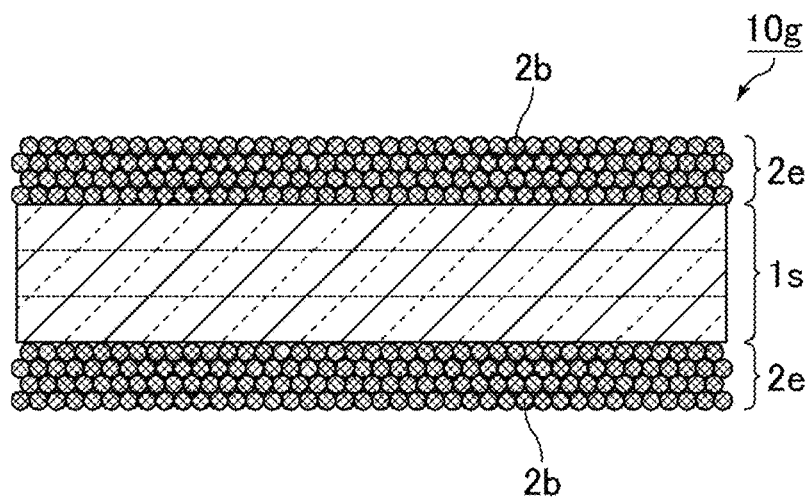
FIG. 14 is a schematic cross-sectional view showing the unsintered plate body and the resin layers being pressed together in the example of producing an unsintered body.

FIG. 11 is a schematic cross-sectional view showing how an unsintered plate body and resin layers are stacked in the example of producing an unsintered body. FIG. 12 is a schematic cross-sectional view showing how an assembly of a laminate block in a mold is vacuum sealed for pressing by hydrostatic pressure in the example of producing an unsintered body. FIG. 13 is a schematic cross-sectional view showing how pressing by hydrostatic pressure is performed in the example of producing an unsintered body. FIG. 14 is a schematic cross-sectional view showing the unsintered plate body and the resin layers being pressed together in the example of producing an unsintered body.

First, as shown in FIG. 11, the unsintered plate body 1s containing a ceramic material powder and the resin layers 2e containing a resin powder 2b are stacked to produce a laminate block 10b. More specifically, the resin layer 2e is stacked on each of a first main surface (a top surface in FIG. 11) and a second main surface (a bottom surface in FIG. 11) of the unsintered plate body 1s to produce the laminate block 10b. In this step, the resin layer 2e may be stacked only on one of the first main surface and the second main surface of the unsintered plate body 1s.

Next, the laminate block 10b is placed between a first mold member 21 and a second mold member 22 of a mold 20 to produce an assembly 30. Then, as shown in FIG. 12, the assembly 30 is placed in a bag 40 and vacuum sealed. The bag 40 is made of a material such as a resin, for example.

Next, as shown in FIG. 13, the assembly 30 vacuum sealed in the bag 40 is sunk in water 60 in a pressure vessel 50. Subsequently, the water 60 is pressurized by a pump 70. Thus, a predetermined hydrostatic pressure is applied to the laminate block 10b via the mold 20 to press together the unsintered plate body 1s and the resin layers 2e by the hydrostatic pressure.

As described above, an unsintered body 10g is produced in which the unsintered plate body 1s and the resin layers 2e are pressed together as shown in FIG. 14. If necessary, the unsintered body 10g may be cut into a shape back-calculated from a possible heat shrinkage rate of the unsintered plate body 1s during firing of the unsintered body 10g (described later) and the desired shape of a ceramic plate body to be obtained.

When the unsintered plate body 1s and the resin layers 2e are pressed together by hydrostatic pressure, the resin layers 2e are pressed onto the first main surface and the second main surface of the unsintered plate body 1s. This forms scattered recesses having a shape derived from the shape of the resin powder 2b on the first main surface and the second main surface of the unsintered plate body 1s.

When hydrostatic pressure is used as the pressurization method, a uniform pressure is applied to the laminate block 10b, so that variation of load on the unsintered plate body 1s is prevented or reduced. Thus, when the unsintered plate body 1s is sintered in producing a ceramic plate body (described later), warpage of a ceramic plate body to be obtained will be prevented or reduced, without using a specific weight such as a conventional porous spacer. When the variation of load on the unsintered plate body 1s is prevented or reduced, variation of heat shrinkage degree inside the unsintered plate body 1s is prevented or reduced during sintering of the unsintered plate body 1s. Thus, deformation of a ceramic plate body to be obtained will be prevented or reduced.

When hydrostatic pressure is used as the pressurization method, the temperature of the laminate block 10b is substantially the same as the temperature of the water 60, so that the fluidity of the binder in the laminate block 10b increases along with an increase in the temperature of the water 60. In this case, the binder has a higher fluidity in the unsintered plate body 1s. Thus, the unsintered plate body 1s has a uniform density and a uniform thickness with less or no warpage. Likewise, the binder has a higher fluidity in the resin layer 2e. Thus, the resin layer 2e has a uniform density and a uniform thickness with less or no warpage. When such an unsintered plate body 1s and such resin layers 2e are pressed together to produce the unsintered body 10g, variation of load on the unsintered plate body 1s is significantly prevented or reduced, which is also owing to the pressing by hydrostatic pressure to apply a uniform pressure to the laminate block 10b. Thus, when the unsintered plate body 1s is sintered in producing a ceramic plate body (described later), warpage of a ceramic plate body to be obtained will be significantly prevented or reduced. When the variation of load on the unsintered plate body 1s is significantly prevented or reduced, variation of heat shrinkage degree inside the unsintered plate body 1s is significantly prevented or reduced during sintering of the unsintered plate body 1s, which is also owing to the uniform density and thickness of the unsintered plate body 1s. Thus, deformation of a ceramic plate body to be obtained will be significantly prevented or reduced.

As is the case with the production of the unsintered body 10g, when the unsintered plate body 1s and the resin layers 2e are pressed together by hydrostatic pressure, it is required to increase the overall fluidity of the binder in the laminate block 10b so that the unsintered plate body 1s and the resin layers 2e each have a uniform density and a uniform thickness with less or no warpage. From this perspective, the unsintered plate body 1s and the resin layer 2e are preferably preheated at 60° C. or higher and lower than 100° C. for at least five minutes before being pressed together by hydrostatic pressure. Specifically, a preheating period is preferably included in which the laminate block 10b is preheated at 60° C. or higher and lower than 100° C. for at least five minutes during the period from the start of sinking of the assembly 30 vacuum sealed in the bag 40 into the water 60 to the start of applying a pressure to the water 60 by the pump 70. To include such a preheating period, for example, application of a pressure to the water 60 by the pump 70 may be started after the assembly 30 vacuum sealed in the bag 40 is sunk in the water 60 at 60° C. or higher and lower than 100° C., and the temperature of the laminate block 10b is maintained at 60° C. or higher and lower than 100° C. for five minutes. Alternatively, application of a pressure to the water 60 by the pump 70 may be started after the assembly 30 vacuum sealed in the bag 40 is sunk in the water 60 and the temperature of the water 60 is then raised to 60° C. or higher and lower than 100° C. so as to maintain the temperature of the laminate block 10b at 60° C. or higher and lower than 100° C. for five minutes. The pressing by hydrostatic pressure cannot be performed when the temperature of the water 60 is 100° C. or higher because the water 60 will be boiled. Preferably, the preheating time (the length of preheating period) is five minutes or more and 15 minutes or less. The preheating temperature (the temperature during the preheating period) may be the same as the pressurization temperature during pressing by hydrostatic pressure.

Meanwhile, when uniaxial pressing is used as the pressurization method, it is difficult to apply a uniform pressure to the laminate block 10b due to strain on a pressing axis, warpage of a pressure plate, or the like. The variation of load on the unsintered plate body 1s will not be prevented or reduced unless a uniform pressure is applied to the laminate block 10b. Thus, when the unsintered plate body 1s is sintered in such a state, warpage of a ceramic plate body to be obtained will not be prevented or reduced. In addition, the variation of heat shrinkage degree inside the unsintered plate body 1s will not be prevented or reduced during sintering of the unsintered plate body 1s, and deformation of a ceramic plate body to be obtained will thus not be prevented or reduced.

Forming Through Hole in Unsintered Body

Although not shown, the unsintered body 10g may be provided with a through hole that penetrates the unsintered body 10g in the stacking direction of the ceramic green sheets.

The through hole is preferably formed by drilling. In this case, the unsintered body 10g is drilled from its first main surface to its second main surface or vice versa such that the through hole penetrating the unsintered body 10g in the stacking direction is formed. The drilling may be performed under any conditions.

One through hole may be formed or two or more through holes may be formed.

No through hole may be formed. In this case, the above step is omitted.

Producing Ceramic Plate Body

Figure 15:
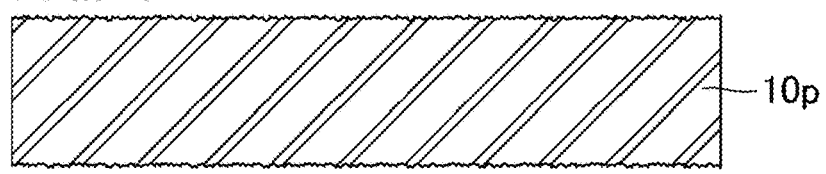
FIG. 15 is a schematic cross-sectional view of an example of producing a ceramic plate body.

FIG. 15 is a schematic cross-sectional view of an example of producing a ceramic plate body.

The unsintered body 10g is fired to burn off the resin layers 2e and sinter the unsintered plate body 1s into a ceramic plate body 10p as shown in FIG. 15. When the unsintered body 10g is provided with a through hole, the ceramic plate body 10p is provided with a through hole penetrating therethrough in a thickness direction thereof.

As described above, the variation of load on the unsintered plate body 1s is prevented or reduced during firing the unsintered body 10g, so that warpage of the ceramic plate body 10p is prevented or reduced. In addition, since the variation of heat shrinkage degree inside the unsintered plate body 1s is prevented or reduced, deformation of the ceramic plate body 10p is prevented or reduced.

Preferably, the firing the unsintered body 10g includes degreasing and sintering.

Thus, the ceramic plate body 10p with scattered recesses on its first main surface and second main surface is produced. In the method of producing an electrolyte sheet, the unsintered plate body 1s and the resin layers 2e are pressed together by hydrostatic pressure in producing the unsintered body 10g. Thus, the ceramic plate body 10p has a warpage height of not more than 300 μm, and a maximum value among values of "$100 \times Q/L_X$", "$100 \times R/L_X$", and "$100 \times S/L_X$" each representing the deformation degree (shear rate) relative to the virtual rectangle resembling the desired shape (which has been described with reference to FIG. 3) is not greater than 1. In other words, the method of producing an electrolyte sheet described above can provide the electrolyte sheet for solid oxide fuel cells of the present invention including the ceramic plate body 10p (for example, the electrolyte sheet 10 in FIG. 1 and FIG. 2).

Unit Cell for Solid Oxide Fuel Cells

Figure 16:
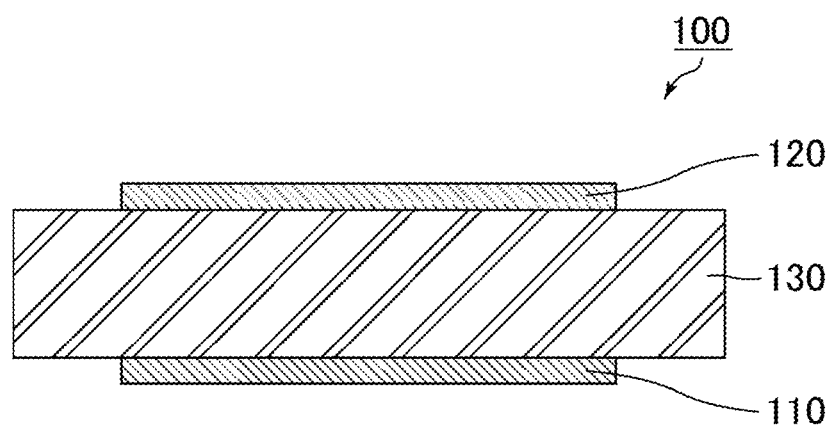
FIG. 16 is a schematic cross-sectional view of an example of a unit cell for solid oxide fuel cells of the present invention.

The following describes an example of the unit cell for solid oxide fuel cells of the present invention. FIG. 16 is a schematic cross-sectional view of an example of a unit cell for solid oxide fuel cells of the present invention.

As shown in FIG. 16, a unit cell 100 for solid oxide fuel cells includes a fuel electrode 110, an air electrode 120, and an electrolyte sheet 130. The electrolyte sheet 130 is disposed between the fuel electrode 110 and the air electrode 120.

The fuel electrode 110 may be a known fuel electrode for solid oxide fuel cells.

The air electrode 120 may be a known air electrode for solid oxide fuel cells.

The electrolyte sheet 130 is the electrolyte sheet for solid oxide fuel cells of the present invention (for example, the electrolyte sheet 10 in FIG. 1 and FIG. 2). Thus, the unit cell 100 is capable of increasing the power generation efficiency of a solid oxide fuel cell with the unit cell.

Method of Producing Unit Cell for Solid Oxide Fuel Cells

The unit cell for solid oxide fuel cells of the present invention is produced by the following method, for example.

First, a slurry for a fuel electrode and a slurry for an air electrode are prepared. The slurry for a fuel electrode is prepared by mixing a powder of a material of a fuel electrode with a binder, a dispersant, a solvent, and the like as appropriate. The slurry for an air electrode is prepared by mixing a powder of a material of an air electrode with a binder, a dispersant, a solvent, and the like as appropriate.

The material of a fuel electrode may be a known material of a fuel electrode for solid oxide fuel cells.

The material of an air electrode may be a known material of an air electrode for solid oxide fuel cells.

The binder, dispersant, solvent, and other additives in a slurry for a fuel electrode may be those known in a method of forming a fuel electrode for solid oxide fuel cells. The binder, dispersant, solvent, and other additives in a slurry for an air electrode may be those known in a method of forming an air electrode for solid oxide fuel cells.

Then, a first main surface of the electrolyte sheet is coated with the slurry for a fuel electrode to a predetermined thickness and a second main surface of the electrolyte sheet is coated with the slurry for an air electrode to a predetermined thickness. These coating films are dried to form a green layer for a fuel electrode and a green layer for an air electrode.

The green layer for a fuel electrode and the green layer for an air electrode are then fired to form a fuel electrode and an air electrode. The firing conditions such as the firing temperature may be determined as appropriate depending on the material and the like of the fuel electrode or the air electrode.

EXAMPLES

Examples that more specifically disclose the electrolyte sheet for solid oxide fuel cells of the present invention are described below. The present invention is not limited to these examples.

Example 1

An electrolyte sheet of Example 1 was produced by the following method.

Producing Ceramic Green Sheets

Scandia-stabilized zirconia powder, a binder, a dispersant, and an organic solvent were compounded at a predetermined ratio. The organic solvent used was a 7:3 mixture by weight of toluene and ethanol. The compounded product was stirred with a medium made of partially stabilized zirconia at 1000 rpm for three hours to form a ceramic slurry.

Then, the ceramic slurry was formed into a sheet on a first main surface of a carrier film made of polyethylene terephthalate by a known technique of tape casting to give ceramic green tape.

The ceramic green tape was then punched by a known technique into 125-mm square pieces, and the carrier film was removed from the pieces. Thus, ceramic green sheets were produced.

Producing Unsintered Plate Body

Three ceramic green sheets were stacked and compression-bonded to produce an unsintered plate body.

Producing Resin Layer

First, a resin powder, a binder, a dispersant, and an organic solvent were compounded at a predetermined ratio. The resin powder used was a spherical resin powder made of a crosslinked acrylic resin and having a median size $D_{50}$ of 5 µm. The organic solvent used was a 7:3 mixture by weight of toluene and ethanol. The compounded product was stirred with a medium made of partially stabilized zirconia at 1000 rpm for three hours to prepare a ceramic slurry.

Then, the resin slurry was formed into a sheet on a first main surface of a carrier film made of polyethylene terephthalate by a known technique of tape casting to give resin tape.

The resin tape was then punched by a known technique into pieces having the same shape as the ceramic green sheets, and the carrier film was removed from the pieces. Thus, resin sheets as resin layers were produced. Each resin layer had a thickness after drying of not less than 10 µm and not more than 18 µm.

Producing Unsintered Body

First, the unsintered plate body and the resin layers were stacked to produce a laminate block. More specifically, the resin layer was stacked on each of a first main surface and a second main surface of the unsintered plate body to produce a laminate block.

Next, the laminate block was placed between a first mold member and a second mold member of a mold to produce an assembly. Then, the assembly was placed in a bag made of resin and vacuum sealed.

Next, the assembly was sunk in water at 50° C. in a pressure vessel, and the temperature of the laminate block was maintained at 50° C. for two minutes. Thus, the unsintered plate body and the resin layers were preheated at 50° C. for two minutes. Subsequently, the water was pressurized by a pump to apply a hydrostatic pressure of 1200 kgf/cm² (120 MPa) to the laminate block via the mold, whereby the unsintered plate body and resin layers were pressed together by hydrostatic pressure. The pressurization temperature was 50° C., the same as the preheating temperature.

As described above, an unsintered body was produced in which the unsintered plate body and the resin layers were pressed together. Subsequently, the unsintered body was cut into a shape back-calculated from a possible heat shrinkage rate of the unsintered plate body during firing of the unsintered body (described later) and the desired shape of a ceramic plate body to be obtained.

Producing Ceramic Plate Body

The unsintered body was fired in a furnace as follows. First, the unsintered body was degreased by holding the unsintered body at 400° C. for a predetermined time. The degreased unsintered body was sintered by holding the unsintered body at 1400° C. for five hours. The unsintered body was fired as described above to burn off the resin layers and sinter the unsintered plate body into a ceramic plate body. The resulting ceramic plate body had a thickness of 90 µm.

Thus, an electrolyte sheet (ceramic plate body) of Example 1 was produced.

Example 2

An electrolyte sheet of Example 2 was produced as in Example 1, except that the preheating temperature and the pressurization temperature in the producing an unsintered body were changed to 60° C.

Example 3

An electrolyte sheet of Example 3 was produced as in Example 1, except that the preheating temperature and the pressurization temperature in the producing an unsintered body were changed to 70° C.

Example 4

An electrolyte sheet of Example 4 was produced as in Example 1, except that the preheating temperature and the pressurization temperature in the producing an unsintered body were changed to 90° C.

Example 5

An electrolyte sheet of Example 5 was produced as in Example 1, except that the preheating time in the producing an unsintered body was changed to five minutes.

Example 6

An electrolyte sheet of Example 6 was produced as in Example 5, except that the preheating temperature and the pressurization temperature in the producing an unsintered body were changed to 60° C.

Example 7

An electrolyte sheet of Example 7 was produced as in Example 5, except that the preheating temperature and the pressurization temperature in the producing an unsintered body were changed to 70° C.

Example 8

An electrolyte sheet of Example 8 was produced as in Example 5, except that the preheating temperature and the pressurization temperature in the producing an unsintered body were changed to 90° C.

Example 9

An electrolyte sheet of Example 9 was produced as in Example 1, except that the preheating time in the producing an unsintered body was changed to 10 minutes.

Example 10

An electrolyte sheet of Example 10 was produced as in Example 9, except that the preheating temperature and the pressurization temperature in the producing an unsintered body were changed to 60° C.

Example 11

An electrolyte sheet of Example 11 was produced as in Example 9, except that the preheating temperature and the pressurization temperature in the producing an unsintered body were changed to 70° C.

Example 12

An electrolyte sheet of Example 12 was produced as in Example 9, except that the preheating temperature and the pressurization temperature in the producing an unsintered body were changed to 90° C.

Comparative Example 1

An electrolyte sheet of Comparative Example 1 was produced as in Example 1, except that the conditions were changed as follows.
No resin layers were produced.
In the producing an unsintered body, an unsintered plate body and a porous ceramic separator (100 g) on a first main surface of the unsintered plate body were pressed together into an unsintered body.

Comparative Example 2

An electrolyte sheet of Comparative Example 2 was produced as in Comparative Example 1, except that preheating temperature and the pressurization temperature in the producing an unsintered body were changed to 60° C.

Comparative Example 3

An electrolyte sheet of Comparative Example 3 was produced as in Comparative Example 1, except that the preheating temperature and the pressurization temperature in the producing an unsintered body were changed to 70° C.

Comparative Example 4

An electrolyte sheet of Comparative Example 4 was produced as in Comparative Example 1, except that the preheating temperature and the pressurization temperature in the producing an unsintered body were changed to 90° C.

Comparative Example 5

An electrolyte sheet of Comparative Example 5 was produced as in Comparative Example 1, except that the preheating time in the producing an unsintered body was changed to five minutes.

Comparative Example 6

An electrolyte sheet of Comparative Example 6 was produced as in Comparative Example 5, except that the preheating temperature and the pressurization temperature in the producing an unsintered body were changed to 60° C.

Comparative Example 7

An electrolyte sheet of Comparative Example 7 was produced as in Comparative Example 5, except that the preheating temperature and the pressurization temperature in the producing an unsintered body were changed to 70° C.

Comparative Example 8

An electrolyte sheet of Comparative Example 8 was produced as in Comparative Example 5, except that the preheating temperature and the pressurization temperature in the producing an unsintered body were changed to 90° C.

Comparative Example 9

An electrolyte sheet of Comparative Example 9 was produced as in Comparative Example 1, except that the preheating time in the producing an unsintered body was changed to ten minutes.

Comparative Example 10

An electrolyte sheet of Comparative Example 10 was produced as in Comparative Example 9, except that the preheating temperature and the pressurization temperature in the producing an unsintered body were changed to 60° C.

Comparative Example 11

An electrolyte sheet of Comparative Example 11 was produced as in Comparative Example 9, except that the preheating temperature and the pressurization temperature in the producing an unsintered body were changed to 70° C.

Comparative Example 12

An electrolyte sheet of Comparative Example 12 was produced as in Comparative Example 9, except that the preheating temperature and the pressurization temperature in the producing an unsintered body were changed to 90° C.

Comparative Example 13

An electrolyte sheet of Comparative Example 13 was produced as in Example 1, except that the pressurization method in the producing an unsintered body was changed to uniaxial pressing (no preheating).

Comparative Example 14

An electrolyte sheet of Comparative Example 14 was produced as in Comparative Example 13, except that the conditions were changed as follows.

No resin layers were produced.

In the producing an unsintered body, an unsintered plate body and a porous ceramic separator (100 g) on a first main surface of the unsintered plate body were pressed together into an unsintered body.

Evaluation

The electrolyte sheets of Examples 1 to 12 and Comparative Examples 1 to 14 were subjected to the following evaluations.

Deformation Degree

For each of the electrolyte sheets of Examples 1 to 12 and Comparative Example 1 to 14, values of "100×Q/$L_X$", "100×R/$L_X$", and "100×S/$L_X$" were calculated as described above to evaluate the deformation degree. Tables 1 and 2 show the results. The evaluation criteria were as follows.

Desirable: A maximum value among the values of "100×Q/$L_X$", "100×R/$L_Y$", and "100×S/$L_X$" was not greater than 0.5.

Acceptable: A maximum value among the values of "100×Q/$L_X$", "100×R/$L_Y$", and "100×S/$L_X$" was greater than 0.5 and not greater than 1.

Unacceptable: A maximum value among the values of "100×Q/$L_X$", "100×R/$L_Y$", and "100×S/$L_X$" was greater than 1.

Warpage Degree

The electrolyte sheets of Examples 1 to 12 and Comparative Examples 1 to 14 were subjected to measurement of the warpage height by the method described above for evaluation of the warpage degree. Tables 1 and 2 show the results. The evaluation criteria were as follows.

Desirable: The warpage height was not more than 200 μm.

Acceptable: The warpage height was more than 200 μm and not more than 300 μm.

Unacceptable: The warpage height was more than 300 μm.

Each electrolyte sheet was comprehensively evaluated according to the following evaluation criteria based on the evaluation results of the deformation degree and the warpage degree.

Desirable: The deformation degree and the warpage degree were both desirable.

Acceptable: One of the deformation degree and the warpage degree was desirable or acceptable, and the other was acceptable.

Unacceptable: One or both of the deformation degree and the warpage degree were unacceptable.

TABLE 1

| | | Producing Unsintered Plate Body | | | Evaluation | | |
|---|---|---|---|---|---|---|---|
| | Producing Resin Layer | Pressurization method | Preheating time (min) | Preheating temperature (° C.) | Deformation degree | Warpage degree | Comprehensive evaluation |
| Example 1 | Present | Pressing by hydrostatic pressure | 2 | 50 | Acceptable | Acceptable | Acceptable |
| Example 2 | | | | 60 | Acceptable | Acceptable | Acceptable |
| Example 3 | | | | 70 | Acceptable | Acceptable | Acceptable |
| Example 4 | | | | 90 | Acceptable | Acceptable | Acceptable |
| Example 5 | | | 5 | 50 | Acceptable | Desirable | Acceptable |
| Example 6 | | | | 60 | Desirable | Desirable | Desirable |
| Example 7 | | | | 70 | Desirable | Desirable | Desirable |
| Example 8 | | | | 90 | Desirable | Desirable | Desirable |
| Example 9 | | | 10 | 50 | Acceptable | Desirable | Acceptable |
| Example 10 | | | | 60 | Desirable | Desirable | Desirable |
| Example 11 | | | | 70 | Desirable | Desirable | Desirable |
| Example 12 | | | | 90 | Desirable | Desirable | Desirable |

TABLE 2

| | | Producing Unsintered Plate Body | | | Evaluation | | |
|---|---|---|---|---|---|---|---|
| | Producing Resin Layer | Pressurization method | Preheating time (min) | Preheating temperature (° C.) | Deformation degree | Warpage degree | Comprehensive evaluation |
| Comparative Example 1 | Absent | Pressing by hydrostatic pressure | 2 | 50 | Unacceptable | Unacceptable | Unacceptable |
| Comparative Example 2 | | | | 60 | Unacceptable | Unacceptable | Unacceptable |
| Comparative Example 3 | | | | 70 | Unacceptable | Unacceptable | Unacceptable |
| Comparative Example 4 | | | | 90 | Unacceptable | Unacceptable | Unacceptable |
| Comparative Example 5 | | | 5 | 50 | Unacceptable | Unacceptable | Unacceptable |
| Comparative Example 6 | | | | 60 | Unacceptable | Unacceptable | Unacceptable |

TABLE 2-continued

| | Producing Unsintered Plate Body | | | | Evaluation | | |
|---|---|---|---|---|---|---|---|
| | Producing Resin Layer | Pressurization method | Preheating time (min) | Preheating temperature (° C.) | Deformation degree | Warpage degree | Comprehensive evaluation |
| Comparative Example 7 | | | | 70 | Unacceptable | Unacceptable | Unacceptable |
| Comparative Example 8 | | | | 90 | Unacceptable | Unacceptable | Unacceptable |
| Comparative Example 9 | | | 10 | 50 | Unacceptable | Unacceptable | Unacceptable |
| Comparative Example 10 | | | | 60 | Unacceptable | Unacceptable | Unacceptable |
| Comparative Example 11 | | | | 70 | Unacceptable | Unacceptable | Unacceptable |
| Comparative Example 12 | | | | 90 | Unacceptable | Unacceptable | Unacceptable |
| Comparative Example 13 | Present | Uniaxial pressing | — | — | Acceptable | Unacceptable | Unacceptable |
| Comparative Example 14 | Absent | | — | — | Unacceptable | Unacceptable | Unacceptable |

As shown in Table 1, the results of the comprehensive evaluation of the electrolyte sheets of Examples 1 to 12 were excellent with less or no deformation and less or no warpage. In particular, since the electrolyte sheets of Examples 6 to 8 and 10 to 12 were produced with the preheating temperature of 60° C. or higher and lower than 100° C. and the preheating time of five minutes in the producing an unsintered body, the results of the comprehensive evaluation of these electrolyte sheets were higher than those of the electrolyte sheets of Examples 1 to 5 and 9.

As shown in Table 2, in the electrolyte sheets of Comparative Examples 1 to 14, the deformation and warpage were not prevented or reduced, and the results of the comprehensive evaluation were poor.

REFERENCE SIGNS LIST 1g ceramic green sheet
1s unsintered plate body
1t ceramic green tape
2b resin powder
2e resin layer
2t resin tape
10, 130 electrolyte sheet for solid oxide fuel cells (electrolyte sheet)
10b laminate block
10g unsintered body
10p ceramic plate body
20 mold
21 first mold member
22 second mold member
30 assembly
40 bag
50 pressure vessel
60 water
70 pump
100 unit cell for solid oxide fuel cells (unit cell)
110 fuel electrode
120 air electrode
$C_1$ first corner
$C_2$ second corner
$C_3$ third corner
$C_4$ fourth corner
$D_1$ first side
$D_2$ second side
$D_3$ third side
$D_4$ fourth side
$L_X$ length of virtual rectangle in X-axis direction
$L_Y$ length of virtual rectangle in Y-axis direction
$P_1$ intersection of first virtual straight line and second virtual straight line
$P_2$ intersection of second virtual straight line and third virtual straight line
$P_3$ intersection of third virtual straight line and fourth virtual straight line
$P_4$ intersection of fourth virtual straight line and first virtual straight line
Q maximum difference between second side and second virtual straight line in X coordinate
R maximum difference between third side and third virtual straight line in Y coordinate
S maximum difference between fourth side and fourth virtual straight line in X coordinate
$V_1$ first virtual straight line
$V_2$ second virtual straight line
$V_3$ third virtual straight line
$V_4$ fourth virtual straight line
X casting directions
Y directions perpendicular to casting directions

The invention claimed is:

1. An electrolyte sheet for solid oxide fuel cells, the electrolyte sheet comprising:
a ceramic plate body having a warpage height of not more than 300 μm,
the ceramic plate body having a shape defined by four sides in clockwise order in a plan view from a thickness direction of the ceramic plate body, the sides including a first side, a second side meeting the first side at a first corner, a third side meeting the second side at a second corner, and a fourth side meeting the third side at a third corner and meeting the first side at a fourth corner,
wherein in an XY coordinate system of the ceramic plate body in the plan view from the thickness direction with an X axis being a first virtual straight line approximated with 10 points on the first side, a Y axis being a second virtual straight line perpendicular to the first virtual straight line and passing through a point with an X coordinate representing an average of X coordinates of 10 points on the second side, and a virtual origin being an intersection of the first virtual straight line and the second virtual straight line, a third virtual straight line parallel to the first virtual straight line and passing through a point with a Y coordinate representing an average of Y coordinates of 10 points on the third side and a fourth virtual straight line perpendicular to the first virtual straight line and passing through a point with an X coordinate representing an average of X coordinates of 10 points on the fourth side are defined such that a maximum value among values of $100 \times Q/L_X$, $100 \times R/L_Y$, and $100 \times S/L_X$ is not greater than 1, where Q is a maximum difference between the second side and the second virtual straight line in the X coordinate, R is a maximum difference between the third side and the third virtual straight line in the Y coordinate, S is a maximum difference between the fourth side and the fourth virtual straight line in the X coordinate, $L_X$ is a length of a virtual rectangle in an X-axis direction, and $L_Y$ is a length of the virtual rectangle in a Y-axis direction, the virtual rectangle being defined by the first virtual straight line, the second virtual straight line, the third virtual straight line, and the fourth virtual straight line.

2. The electrolyte sheet for solid oxide fuel cells according to claim 1, wherein the ceramic plate body contains sintered scandia-stabilized zirconia.

3. The electrolyte sheet for solid oxide fuel cells according to claim 1, wherein the ceramic plate body has a thickness of 30 μm to 200 μm.

4. The electrolyte sheet for solid oxide fuel cells according to claim 1, wherein the ceramic plate body has a first main surface and a second main surface opposite the first main surface, and one or both of the first main surface and the second main surface include scattered recesses.

5. The electrolyte sheet for solid oxide fuel cells according to claim 1, wherein the warpage height of the ceramic plate body is not more than 200 μm.

6. The electrolyte sheet for solid oxide fuel cells according to claim 1, wherein the maximum value among the values of $100 \times Q/L_X$, $100 \times R/L_Y$, and $100 \times S/L_X$ is not greater than 0.5.

7. A unit cell for solid oxide fuel cells, the unit cell comprising:
a fuel electrode;
an air electrode; and
the electrolyte sheet for solid oxide fuel cells according to claim 1 between the fuel electrode and the air electrode.

8. A method of producing an electrolyte sheet for solid oxide fuel cells, the method comprising:
pressing together an unsintered plate body containing a ceramic material powder and a resin layer containing a resin powder by hydrostatic pressure to produce an unsintered body; and
firing the unsintered body to burn off the resin layer and sinter the unsintered plate body into a ceramic plate body.

9. The method of producing an electrolyte sheet for solid oxide fuel cells according to claim 8, wherein in the producing of the unsintered body, the unsintered plate body and the resin layer are preheated at 60° C. or higher and lower than 100° C. for at least five minutes before being pressed together by the hydrostatic pressure.

10. The method of producing an electrolyte sheet for solid oxide fuel cells according to claim 8, wherein the ceramic material powder contains scandia-stabilized zirconia powder.

11. The method of producing an electrolyte sheet for solid oxide fuel cells according to claim 8, wherein the resin powder has a spherical shape.

12. The method of producing an electrolyte sheet for solid oxide fuel cells according to claim 8, wherein the ceramic plate body has a warpage height of not more than 300 μm,
the ceramic plate body has a shape defined by four sides in clockwise order in a plan view from a thickness direction of the ceramic plate body, the sides including a first side, a second side meeting the first side at a first corner, a third side meeting the second side at a second corner, and a fourth side meeting the third side at a third corner and meeting the first side at a fourth corner,
wherein in an XY coordinate system of the ceramic plate body in the plan view from the thickness direction with an X axis being a first virtual straight line approximated with 10 points on the first side, a Y axis being a second virtual straight line perpendicular to the first virtual straight line and passing through a point with an X coordinate representing an average of X coordinates of 10 points on the second side, and a virtual origin being an intersection of the first virtual straight line and the second virtual straight line, a third virtual straight line parallel to the first virtual straight line and passing through a point with a Y coordinate representing an average of Y coordinates of 10 points on the third side and a fourth virtual straight line perpendicular to the first virtual straight line and passing through a point with an X coordinate representing an average of X coordinates of 10 points on the fourth side are defined such that a maximum value among values of $100 \times Q/L_X$, $100 \times R/L_Y$, and $100 \times S/L_Y$ is not greater than 1, where Q is a maximum difference between the second side and the second virtual straight line in the X coordinate, R is a maximum difference between the third side and the third virtual straight line in the Y coordinate, S is a maximum difference between the fourth side and the fourth virtual straight line in the X coordinate, $L_X$ is a length of a virtual rectangle in an X-axis direction, and $L_Y$ is a length of the virtual rectangle in a Y-axis direction, the virtual rectangle being defined by the first virtual straight line, the second virtual straight line, the third virtual straight line, and the fourth virtual straight line.

13. The method of producing an electrolyte sheet for solid oxide fuel cells according to claim 12, wherein the warpage height of the ceramic plate body is not more than 200 μm.

14. The method of producing an electrolyte sheet for solid oxide fuel cells according to claim 12, wherein the maximum value among the values of $100 \times Q/L_X$, $100 \times R/L_Y$, and $100 \times S/L_X$ is not greater than 0.5.

15. The method of producing an electrolyte sheet for solid oxide fuel cells according to claim 8, wherein the ceramic plate body has a thickness of 30 μm to 200 μm.

16. The method of producing an electrolyte sheet for solid oxide fuel cells according to claim 8, wherein the ceramic plate body has a first main surface and a second main surface opposite the first main surface, and one or both of the first main surface and the second main surface include scattered recesses.

17. A method of producing a unit cell for solid oxide fuel cells, the method comprising:
forming the electrolyte sheet for solid oxide fuel cells according to claim 8;
forming a green sheet for a fuel electrode on a first main surface of the electrolyte sheet;

forming a green sheet for an air electrode on a second main surface of the electrolyte sheet opposite the first main surface; and firing the electrolyte sheet having the green sheet for the fuel electrode and the green sheet for the air electrode to form the unit cell.

* * * * *